Patented Feb. 5, 1952

2,584,664

UNITED STATES PATENT OFFICE 2,584,664

SYNTHESIS OF MANY-MEMBERED CYCLIC KETONES

Alfred T. Blomquist and Ralph Donald Spencer, Ithaca, N. Y.

No Drawing. Application December 3, 1947, Serial No. 789,554

22 Claims. (Cl. 260—586)

This invention relates to a novel method for the synthesis of many-membered cyclic ketones.

The synthesis of large ring or macrocyclic ketones has previously been carried out by the pyrolysis of thorium salts of dibasic acids, by the cyclization of dinitriles and also by a method involving the intramolecular alkylation of an $\omega$-iodo-$\beta$-ketoester. All of these prior art methods have serious disadvantages which render them economically and commercially unattractive. The pyrolysis technique results generally in low yields. The dinitriles and $\omega$-iodo-$\beta$-ketoesters employed as starting materials in the other two methods are relatively difficult and expensive to prepare. In addition, in all of the prior art syntheses considerable difficulty is encountered in separating the desired cyclic ketones from the accompanying by-products.

A primary object of the present invention is to provide a novel method for the synthesis of many-membered cyclic monoketones and diketones, particularly carbocyclic ketones.

A further object of the invention is to provide a method for synthesizing large ring ketones which is superior to the prior art methods of synthesis with respect to yield, simplicity and availability of starting materials, and ease of separating the desired ketone products.

An additional object of the invention is to provide a novel and convenient technique for the synthesis of dl-muscone and civetone.

Broadly, the novel process of the present invention comprises: (1) cyclizing an appropriate bifunctional ketene by self-condensation under conditions of high dilution and (2) hydrolyzing and decarboxylating the cyclic ketene derivative from (1) to form a cyclic ketone.

In a more specific embodiment, the invention comprises: (1) reacting a diacyl halide under anhydrous conditions in the presence of a dehydrohalogenating agent and a large excess of an inert organic solvent to form a cyclic ketene derivative, and (2) simultaneously hydrolyzing and decarboxylating the cyclic ketene derivative from (1) to form a large ring cyclic ketone.

Although step (1) above in its broadest concept comprises the self-condensation or cyclization of an appropriate bifunctional ketene under conditions of high dilution, we have found that the first step of the synthesis is most conveniently carried out with a dibasic acid halide which undergoes dehydrohalogenation to form the desired bifunctional ketene in situ. By presently known methods it is not possible to form a stable bifunctional ketene in good yield and isolate the same in the pure state. Accordingly, we prefer to employ a dicarboxylic acid halide, particularly a chloride or bromide, or a derivative thereof as the starting material for our process. The fluorides and iodides may also be employed but are of less practical interest.

The process is applicable in principle to any bifunctional ketene of the structure

where M is a bridging group of atoms whose spatial configuration will permit the intramolecular or inter-intramolecular reaction of the two ketene groups to yield a cyclic monoketone of the type

or a cyclic diketone of the type

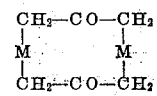

or a mixture of both. Accordingly, we may employ as the preferred starting material any diacyl halide or derivative thereof having the structure

X—CO—CH$_2$—M—CH$_2$—CO—X where X is a halogen atom, preferably chlorine or bromine, and M is a bridging group as previously defined. The preferred compounds contain from 4 to 30 atoms in the group M, or in other words, the diacyl chain contains from 8 to 34 atoms. As illustrative of the various types of acid halides which may be employed, the following classes may be named (in the structural formulae, $n$, $m$, $x$, $y$, and $z$ are integers):

(a) 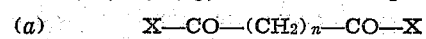

where —(CH$_2$)$_n$— is a polymethylene chain in which $n$ may vary from 6 to 32 or higher. This type of compound is of special interest where $n$ has a value of from 14 to 32, particularly from 14 to 18. Representative of this class are the halides of suberic acid, azelaic acid, sebacic acid, hendecanedioic acid, dodecanedioic acid, thapsic acid, heptadecanedioic acid, etc.

(b) 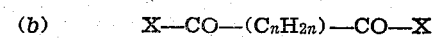

where —C$_n$H$_{2n}$— is an aliphatic branched carbon chain. As illustrative of this class of compounds there may be mentioned the halides of 3-methylhexadecanedioic acid, 3-methylheptadecanedioic acid, 4-methylhexadecanedioic acid, etc.

(c)  X—CO—(CH$_2$)$_n$—CH=CH—(CH$_2$)$_m$—CO—X

This class of compounds is of particular interest where both $n$ and $m$ have values of 6 or 7. Typical compounds in this class are the halides of 9-hexadecenedioic acid, 9-octadecenedioic acid, 8-hexadecenedioic acid, 8-heptadecenedioic acid, etc.

(d)  X—CO—(CH$_2$)$_n$—C≡C—(CH$_2$)$_m$—CO—X

Typical compounds of this category are the halides of 9-octadecynedioic acid, 10-eicosynedioic acid, 9-nonadecynedioic acid, etc.

(e)  X—CO—(CH$_2$)$_n$—CH=CH—CH=CH—(CH$_2$)$_m$—CO—X

Representative compounds of this class are the halides of 7,9-hexadecadienedioic acid, 8,10-octadecadienedioic acid, 9,11-eicosadienedioic acid, etc.

(f)  X—CO—(CH$_2$)$_x$—CH=CH—(CH$_2$)$_y$—CH=CH—(CH$_2$)$_z$—CO—X

In this class typical compounds are the halides of 5,11-hexadecadienedioic acid, 6,11-heptadecadienedioic acid, 6,12-octadecadienedioic acid, etc.

(g)
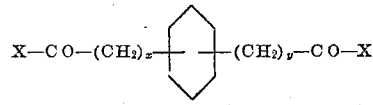

Typical members of this group are the halides of o-, m-, and p-phenylenebisoctanoic acids, o-, m-, and p-phenylenebisnonanoic acids, o-, m-, and p-phenylenebisdecanoic acids, etc.

(h)
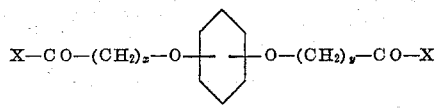

Representative compounds of this class are the halides of o-, m-, and p-bis (ω-carboxyhexyloxy) benzene, o-, m-, and p-bis (ω-carboxyheptyloxy) benzene, o-, m-, and p-bis (ω-carboxyoctyloxy) benzene, etc.

(i)  X—CO—(CH$_2$)$_x$—O—(CH$_2$)$_y$—CO—X

Illustrative members of this group are the halides of 8-oxapentadecanedioic acid, 9-oxaheptadecanedioic acid, 9-oxaoctadecanedioic acid, etc.

(j)  X—CO—(CH$_2$)$_x$—O—(CH$_2$)$_y$—O—(CH$_2$)$_z$—CO—X

In this category typical compounds are the halides of 6,10-dioxapentadecanedioic acid, 7,10-dioxahexadecanedioic acid, 6,11-dioxahexadecanedioic acid, etc.

(k)  X—CO—(CH$_2$)$_x$—S—(CH$_2$)$_y$—CO—X

The halides of the following acids are typical compounds within this class: 8-thiapentadecanedioic acid, 9-thiaoctadecanedioic acid, 9-thiaheptadecanedioic acid, etc.

(l)  X—CO—(CH$_2$)$_x$—S—(CH$_2$)$_y$—S—(CH$_2$)$_z$—CO—X

Representative compounds in this class are the halides of 6,10-dithiapentadecanedioic acid, 7,10-dithiahexadecanedioic acid, 6,11-dithiahexadecanedioic acid, etc.

(m)  X—CO—(CH$_2$)$_x$—CO—(CH$_2$)$_y$—CO—X

Typical members of this group are the halides of 8-oxopentadecanedioic acid, 9-oxoheptadecanedioic acid, 9-oxooctadecanedioic acid, etc.

(n)  X—CO—(CH$_2$)$_x$—CO—(CH$_2$)$_y$—CO—(CH$_2$)$_z$—CO—X

Illustrative of this class of compounds are the halides of 6,10-dioxopentadecanedioic acid, 7,10-dioxohexadecanedioic acid, 6,11-dioxohexadecanedioic acid, etc.

(o)  X—CO—(CH$_2$)$_x$—O—CO—(CH$_2$)$_y$—CO—X

Representative compounds of this type are the halides of ε-carboxypentyl hydrogen azelate, ε-carboxypentyl hydrogen sebacate, ω-carboxynonyl hydrogen adipate, etc.

(p)  X—CO—(CH$_2$)$_x$—O—CO—(CH$_2$)$_y$—CO—O—(CH$_2$)$_z$—CO—X

Examples of typical compounds falling in this class are the halides of di (β-carboxyethyl) sebacate, di (δ-carboxybutyl) succinate, di (ε-carboxypentyl) adipate, etc.

The oxygen and sulphur derivatives of the diacyl halides listed in groups (i) to (p) inclusive may be represented more broadly by the structures X—CO—(CH$_2$)$_x$—A—(CH$_2$)$_y$—CO—X and X—CO—(CH$_2$)$_x$—A—(CH$_2$)$_y$—B—(CH$_2$)$_z$—CO—Z where A and B are bivalent groups which are non-reactive toward acid halides, ketenes, and ketene dimers.

Of the numerous classes of diacyl halide compounds which may be employed in the cyclization step, the classes (a), (b), and (c) as defined above are of particular importance. As will be shown hereinafter, the reaction of certain compounds of the types (b) and (c) provide novel and highly useful techniques for the synthesis of dl-muscone and civetone which are the chief odoriferous constituents of natural musk and civet, respectively, and are therefore highly desirable materials in the perfume industry.

Diacyl chlorides for use in the synthesis may be obtained in a relatively pure state and relatively convenient by reaction of an appropriate dibasic acid with thionyl chloride as described in greater detail in connection with the specific examples. However, the acid chlorides and other halides may also be prepared by any of numerous other suitable methods well known to the art.

The ketene cyclization reaction is carried out by reacting an appropriate dibasic acid halide with a tertiary base dehydrohalogenating agent under anhydrous conditions and under conditions of high dilution with an inert organic solvent.

The resultant cyclic derivatives are separated and subjected to hydrolysis and decarboxylation to yield cyclic mono- and/or diketones.

The general course of the reaction as applied to an aliphatic dicarboxylic acid halide may be represented as follows:

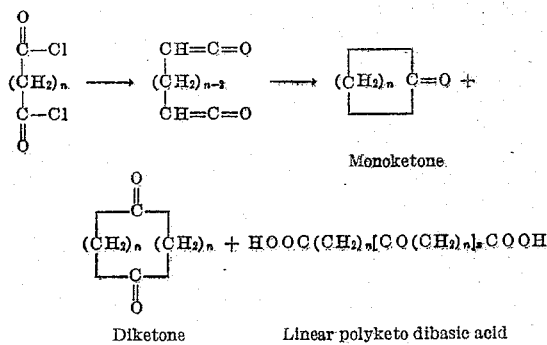

Diketone    Linear polyketo dibasic acid

Although the mechanism of the cyclization step is not shown above, the reaction presumably proceeds by way of dimerization of the ketene molecule through intra-molecular or inter-intra-molecular condensation to form a cyclic intermediate. During the course of the reaction considerable linear ketene polymer is also formed some of which is insoluble in the organic solvent and remains behind with the tertiary base hydrohalide formed during the dehydrohalogenating step and from which it can easily be separated because of its insolubility in water. The soluble linear ketene polymer may be separated from the solution of cyclic ketene intermediates when desired by a simple alkali wash. As indicated in the above equation for the reaction, both monoketones and diketones may be formed depending upon the extent of intramolecular and inter-intramolecular condensation.

The dehydrohalogenating agents which are suitable for the cyclization reaction comprise generally the tertiary aliphatic, including cycloaliphatic, amines, e. g. trimethylamine, triethylamine, tripropylamine, higher trialkylamines, diethylmethylamine, ethylmethylpropylamine, N-ethylpiperidine, N-isopropylpiperidine, N-methylhexahydroazepine, N-methylpyrrolidine, N,N'tetramethylethylenediamine, etc. It is preferred to use at least the stoichiometric amount of dehydrohalogenating agent, for example, at least about two moles of a tertiary monamine for each mole of diacyl halide reacted. Greater amounts of the dehydrohalogenating agent, such as three or four moles or more per mole of acid halide, may be employed if desired.

In order to promote the formation of the desired cyclic products and to avoid the production of excessive amounts of linear ketene polymer, it is necessary to conduct the cyclization reaction in the presence of a substantial excess of an inert organic solvent. Among the solvents which are suitable are diethyl ether, dimethyl ether, dibutyl ether, benzene, toluene, ligroin, trichlorethylene, tetrachlorethylene, carbon tetrachloride, chlorobenzene, chloroform, various aliphatic hydrocarbons such as butane, pentane, etc. The mole ratio of solvent to acid halide reactant should be within the range of from about 100 to about 5,000, preferably from about 200 to about 2,000.

The temperature of the cyclization reaction may vary from about 0° C. to about 100° C. dependent largely upon the particular organic solvent employed as a reaction medium. The reaction is most conveniently carried out at the refluxing temperature of the solvent. For this reason, low boiling solvents are preferred since the cyclization reaction may then be effected at relatively low temperatures which is desirable in view of the comparative instability of the cyclic ketene dimers and the possible reversibility of the cyclization reaction. Atmospheric pressure is the most practical and convenient pressure for the reaction but it is within the scope of the invention to employ subatmospheric or superatmospheric pressures. The reaction time may vary from about 5 hours to about 75 hours, but generally it is desirable to avoid the use of excessive reaction times since the yield of the desired cyclic derivatives tends to decrease with increasing reaction time as a result of a possible reversibility of the dimerization reaction and/or further condensation of the ketene intermediates.

The maintenance of strictly anhydrous conditions is essential in the cyclization step since both the acid halide reactant and the bifunctional ketene intermediate will react readily with water to give undesirable side products. Alcohols, primary amines, secondary amines and other compounds containing active hydrogen must also be excluded for the same reason.

In view of the fact that the cyclization reaction is effected in the presence of a large excess of inert solvent and also in view of the relatively long reaction time, the process is well suited to batch operation. However, it is within the scope of the invention to employ continuous process methods in which the excess organic solvent may be separated from the reaction products and recycled to the cyclization step.

In the second major step of the process the cyclic ketene derivatives are separated and subjected to hydrolysis and decarboxylation to form the desired cyclic ketones. As previously mentioned, the cyclic intermediate compounds are soluble in the organic solvent which is employed as a reaction medium in the cyclization step. Accordingly, the solution of cyclic derivatives (along with some soluble linear ketene polymer) is readily separated by filtration from the precipitated tertiary amine hydrohalide which is formed as a result of the dehydrohalogenation. In some instances it may be convenient or desirable to distil from the reaction mixture some of the excess solvent prior to the filtration. The separated solution of cyclic compounds in the organic solvent is given a mild acid wash, preferably with hydrochloric acid, to remove a major portion or, in some cases, all of the unreacted tertiary amine.

The solution of cyclic derivatives in organic solvent may be subjected to simultaneous hydrolysis and decarboxylation, by any one of numerous methods but we have found that three principal methods give the best results:

(1) By means of an excess of water with a trace of a strong acid catalyst, such as hydrochloric acid, in solution in an inert non-basic solvent, such as dioxane,
(2) By means of alcoholic potassium hydroxide, and
(3) By means of an aqueous solution of an inert non-basic solvent, such as aqueous dioxane, in the presence of a trace of a tertiary amine, such as triethylamine, as a catalyst.

It is also possible to effect hydrolysis of the cyclic ketene derivatives by simply refluxing the solution thereof with an excess of water but this method is in most cases too slow and is generally not preferred. By introducing or having present small amounts or traces of a tertiary amine, however, the hydrolysis with water may be carried out successfully and in reasonably short time. Obviously, many slight variations within the skill of the art may be employed in the hydrolysis-decarboxylation step of the process.

The following examples illustrate certain specific embodiments of the invention, but it will be understood that the examples are for purposes of illustration only and are not intended to restrict the generally broad scope of the invention as hereinbefore described.

Example I

The acid chloride of suberic acid was prepared by adding to 3.0 g. of the acid about 5 cc. of thionyl chloride. The mixture was heated at 55° C. for about 2 hours and then on a steam bath until evolution of hydrogen chloride and sulphur dioxide had ceased. Excess thionyl chloride was removed by the suction action of an aspirator while heating gently leaving the crude suberic acid chloride as a residue.

A cyclization reaction vessel equipped with a stirrer, a reflux condenser, and a dropping funnel was thoroughly dried and charged with 500 cc. of anhydrous diethyl ether and 20 cc. of triethylamine. The suberic acid chloride prepared as above and 200 cc. of anhydrous diethyl ether were introduced into the dropping funnel. The stirrer was started and the reaction vessel was heated to a temperature sufficient to cause gentle refluxing of the diethyl ether. Dropwise addition of the suberic acid chloride was started and was completed over a period of 26 hours. The dropping funnel was rinsed down with 50 cc. of diethyl ether and refluxing was continued for another hour.

The ether solution from the cyclization was decanted from the precipitated triethylamine hydrochloride and trace of insoluble polymer into a separatory funnel. After shaking with a slight excess of dilute hydrochloric acid, it was washed with water until the washings were neutral to Congo red. The solution was dried over magnesium sulfate and then fractionally distilled. To the residual light yellow oil was added 5 cc. of alcohol, and slowly, with cooling, a solution of 1.8 g. of potassium hydroxide in 20 cc. of alcohol. The solution was allowed to stand at room temperature for ten hours and was then refluxed for two hours more. The reaction mixture was diluted with 50 cc. of water and thoroughly extracted with ether. The ether extract was fractionally distilled and from the alcoholic solution which remained was isolated 93 mg. of shining white plates, M. P. 144–145.5° C. Distillation of the filtrate gave 642 mg. (33.3%) of cyclo-heptanone, B. P. 176° C./735 mm. An additional 100 mg. of slightly yellow crystals, M. P. 143–146.5° C. was isolated by crystallization from alcohol of the residue from the distillation of the cyclo-heptanone. The two crops represented a yield of 10% of 1,8-cyclo-tetradecanedione which was identified through the preparation of its disemicarbazone and dioxime derivatives. Crystallization from alcohol raised the melting point to 147.5–148° C. and this was not changed by a vacuum sublimation. This cyclic diketone is a novel compound which has not been previously reported in the chemical literture.

Example II

Using the cyclization apparatus described in Example I and the same general reaction technique, 4.16 grams (0.0185 mole) of azelayl chloride were dissolved in 250 cc. of anhydrous diethyl ether and the solution introduced into the dropping funnel. The reaction vessel was charged with 14.96 grams (0.037 mole) of triethylamine in solution in 500 cc. of ether. The addition of the acid chloride solution was carried out over a period of 36 hours while maintaining a temperature of 36–40° C. in the reaction vessel. Upon completion of the reaction an additional 50 cc. of ether was employed to wash down the dropping funnel.

After distilling the major portion of the ether from the reaction flask, the residual solution was separated and washed with an excess of hydrochloric acid followed by water washing. Complete removal of ether was effected by the use of a steam bath and suction. Hydrolysis and decarboxylation of the remaining product were effected by refluxing with a solution of alcoholic potassium hydroxide.

After steam distillation of the hydrolyzed and decarboxylated material, a tan colored solid material was separated by filtration which, upon recrystallization from ether and sublimation, yielded solid white crystals of 1,9-cyclo-hexadecanedione melting at 75–76.5° C.

Example III

In this experiment a reaction vessel of the same type described in Example I was employed. A solution of 50 cc. (36.5 g., 0.36 mole) of triethylamine in 100 cc. of anhydrous diethyl ether was charged to the vessel and a solution of 11.9 g. (0.0498 mole) of sebacyl chloride in 600 cc. of anhydrous diethyl ether was added dropwise from the dropping funnel over a period of 57 hours. The dropping funnel was rinsed with ether and the mixture allowed to stand over night at room temperature.

Most of the ether was distilled on a steam bath. When the volume became small the remainder of the ether and most of the excess triethylamine was removed with suction at room temperature and finally for a short period at 50–60° C. A solution of 3 g. (0.053 mole) of potassium hydroxide in 50 cc. of alcohol was added and the resulting solution was refluxed on the steam bath for three hours. A precipitate, presumably potassium carbonate, started to come down at once. Upon the addition of 50 cc. of water the potassium carbonate readily dissolved, but the 1,10-cyclo-octadecanedione was precipitated. This solution was steam distilled and filtration of the residue from the steam distillation gave 783 mg. (22.5%) of crude, faintly brown 1,10-cyclo-octadecanedione, M. P. 80–90° C. One crystallization from ether gave 446 mg. of almost white cubes, M. P. 93–96° C. Concentration of the mother liquor yielded an additional 117 mg., M. P. 92.5–95° C. This represents a yield of 16% of relatively pure diketone.

Example IV

In this example, the apparatus and procedure were substantially the same as employed in Example I. The reaction flask was charged with 500 cc. of anhydrous diethyl ether and 14.96 g. (0.037 mole) of triethylamine. A solution of 5.27 g. (0.0185 mole) of the acid chloride of hendecanedioic acid in 250 cc. of ether was introduced into the dropping funnel. The acid chloride solution was added dropwise to the reaction flask over a period of 36 hours while the temperature was maintained at 36–40° C. An additional 50 cc. of ether was employed to wash down the funnel.

Ether was distilled directly from the reaction flask until the volume was approximately 250 cc., and the solution was decanted into a separatory funnel. It was then washed with an excess of hydrochloric acid and finally with water until the washings were neutral to Congo red. The solution was then heated on the steam bath until the ether was distilled. The last traces of ether were removed by suction, first at room temperature, and then at 50–60° C. To the residual oil was added a solution of 1.5 g. (0.022 mole) of potassium hydroxide (85%) in 50 cc. of ethyl alcohol, and the solution was refluxed for five hours. At the conclusion of this period, water was added and the solution steam-distilled.

The residue of the steam-distillation was filtered, and 1.316 g. of a brown-colored solid was recovered. This material partially melted at 43° C., and after recrystallization from ethyl alcohol, 725 mg. of a faintly-tan crystalline solid was isolated. The melting point of this solid was 46–49° C. and recrystallization of it from ether gave an almost-white solid melting at 48–51° C. This represents a 26% yield of cycloeicosane-1,11-dione.

Example V

The acid chloride of dodecanedioic acid was prepared by reacting 50 g. (0.0218 mole) of well dried dodecanedioic acid with 5 cc. (0.07 mole) of purified thionyl chloride at a temperature of 50–55° C. until sulphur dioxide and hydrogen chloride were no longer evolved. The excess thionyl chloride was removed by means of heat and a water aspirator leaving a residue of the crude acid chloride of dodecanedioic acid.

To a refluxing and well stirred mixture of 500 cc. of anhydrous ether and 8.5 g. (0.084 mole) of anhydrous triethylamine was added dropwise 5.8 g. (0.0218 mole) of the unpurified acid chloride of dodecanedioic acid in 300 cc. of anhydrous ether in the course of forty hours. On completion of the addition, the dropping funnel was rinsed down with 50 cc. of ether which was run rapidly into the reaction mixture. Stirring and refluxing were continued for several hours more. The ether was then concentrated to a volume of 200 cc., and the ether filtered from the precipitated triethylamine hydrochloride and polymer.

The ethereal solution was washed once with 15 per cent hydrochloric acid, and twice with distilled water. The solution was then dried over magnesium sulfate, filtered, and distilled. A light mobile oil remained. To a solution of the oil in 10 cc. of commercial ethyl alcohol was added 3.0 g. (0.053 mole) of potassium hydroxide dissolved in 50 cc. of 95 per cent ethanol. The mixture was heated on a steam bath under reflux for three hours. The alcohol was distilled and the residue treated with 150 cc. of distilled water. The mixture was made acid to litmus and vigorously steam distilled. A total of 200 cc. of distillate was collected. The cloudy distillate was saturated with salt and extracted three times with ether. The ether was dried over magnesium sulfate, filtered and distilled. A small amount (0.13 g.) of pale yellow oil remained, which had a strong camphor-like odor. It readily formed a semi-carbazone melting at 200–202° C. (corr.), which agrees with the value of 200° C. reported for cycloundecanone. The yield of the 11 membered ketone was 3.5 per cent.

The residue from the steam distillation was made basic with 10 per cent potassium carbonate, and extracted four to five times with ether. Distillation of the dried ether layer left a yellow oil which, after removal of excess ether in vacuo, solidified. The solid distilled at 220–230° C. at 1 mm., and melted at 48–52° C. The yield was 0.58 g. (16 per cent).

Sublimation of a small portion of the crude diketone yielded white crystalline cyclodocosane-1,12-dione, M. P. 54–55° C.

Example VI

In this experiment a slight modification of the apparatus described in Example I was employed. The reaction flask was provided with a short fractionating column and condenser by means of which ether was distilled from the reaction flask into a second flask wherein the solution of acid chloride was further diluted before being introduced into the reaction flask.

The acid chloride of thapsic acid was prepared from 4.0 g. of thapsic acid by the thionyl chloride reaction described in Example I. The general procedure for the cyclization step was substantially the same as described in Example I. The addition time for the acid chloride was 53 hours.

The reaction mixture was distilled until about 300 cc. of solution remained. This was decanted from the precipitated amine salt and ketene polymer and shaken with a slight excess of dilute hydrochloric acid in a separatory funnel to remove the excess amine. The ether solution was washed with water, dried, and distilled on the steam bath. The viscous orange or amber oil was refluxed for three hours with a solution of 1.5 g. (0.027 mole) of potassium hydroxide in 25 cc. of alcohol. The reaction mixture was diluted with 50 cc. of water and thoroughly extracted with ether. The ether extract was washed with water, dried over magnesium sulfate and distilled. Removal of the ether left an aqueous-alcoholic residue which deposited 1,16-cyclotriacontanedione in needles. The yield of diketone in the form of white crystals melting at 76–77° C. was approximately 5.3%. The filtrate from the diketone was distilled and a 14% yield of cyclopentadecanone boiling at 107–108° C./0.25 mm. was recovered.

Example VII

Utilizing the same apparatus and following substantially procedure employed in Example I, the acid chloride from 2.344 g. of heptadecanedioic acid was cyclized. The addition of the acid chloride solution to the reaction vessel was carried out over a period of 29 hours. The reaction mixture was worked up in substantially the same manner as described in connection with Example I. A yield of 11% cyclohexadecanone having a boiling point of 118.124° C./0.3–0.35 mm. was recovered.

Example VIII

A mixture of 1.8 g. (5.8 millimoles) of 9-hexadecenedioic acid, 2 cc. (3.3 g., 28 millimoles) of thionyl chloride, and 5 cc. of absolute ether was warmed gently. Sulfur dioxide and hydrogen chloride distilled gradually. After 0.5 hour the temperature was raised to about 70° C. and kept there for one hour. Removal of excess thionyl chloride in vacuo at 50–60° C. gave 2.03 g. of the crude acid chloride.

A solution of the crude acid chloride in 200 cc. of absolute ether was added over a period of 15 hours from a Hershberg dropping funnel down the condenser into a stirred, refluxing mixture of 500 cc. of absolute ether and 10 cc. of triethylamine. At the end of this time the dropping funnel and condenser were rinsed with absolute ether and 500 cc. of ether was removed by distillation of the combined ethereal solution. The remaining ethereal solution, triethylamine hydrochloride, and polymer was washed with 50-cc. and 30-cc. portions of 3 N-hydrochloric acid and finally with water until the washes were neutral to Congo red. The ethereal solution was dried over anhydrous magnesium sulfate.

The ether was distilled and the residue weighed 1.72 g. In order to hydrolyze ketene dimers, this material was dissolved in a solution of 2.0 g. of potassium hydroxide in 2.0 cc. of water and 30 cc. of methanol. The solution was kept at room temperature for 40 hours and then was refluxed one and one-half hours. The saponification mixture was cooled, diluted with water to about 200 cc., and the neutral organic material extracted repeatedly with ether. The ethereal solution was washed with water and dried over anhydrous magnesium sulfate. The ether was distilled and 545 mg. of crude civetone was obtained as a residue. Upon distillation, 476 mg. of a nearly colorless distillate was recovered representing a yield of 33% based on the original dibasic acid.

*Example IX*

The diacyl chloride was prepared from 1.8 g. (6.0 millimoles) of 3-methylhexadecanedioic acid exactly as the corresponding diacyl chloride was prepared in Example VIII. The cyclization procedure was exactly the same except that the solution of diacyl chloride was added over 23 hours. The product was isolated as before. The saponification mixture was allowed to stand at room temperature for five and one-half days.

The saponification mixture was diluted with 250 cc. of water and the dl-muscone was extracted into ether; 450 mg. was obtained. The dl-muscone was distilled at 0.2 mm. pressure with a bath temperature of about 140° C. The colorless dl-muscone weighed 315 mg. representing a yield of 22% based on the 3-methylhexadecanedioic acid.

We claim:

1. A process for preparing cyclic ketones which comprises dehydrohalogenating a dicarboxylic acid halide having from 8 to 34 atoms in the dicarboxylic chain by reacting said halide with an aliphatic tertiary amine under anhydrous conditions in an excess of an inert organic solvent, the mole ratio of said solvent to said halide being in excess of about 100, separating a cyclic ketene fraction, subjecting the latter to hydrolysis and decarboxylation, and recovering a cyclic ketone.

2. A process for preparing cyclic ketones which comprises dehydrohalogenating a dicarboxylic acid halide having from 8 to 34 atoms in the dicarboxylic chain by reacting said halide with an aliphatic tertiary amine under anhydrous conditions in an excess of an inert organic solvent, the mole ratio of said solvent to said halide being within the range of from about 100 to about 5,000, separating from the resultant reaction products a cyclic ketene fraction, hydrolyzing and decarboxylating the latter, and recovering a cyclic ketone.

3. A process for preparing cyclic ketones which comprises dehydrohalogenating a dicarboxylic acid chloride having from 8 to 34 carbon atoms in the dicarboxylic chain by reacting said chloride with an aliphatic tertiary amine under anhydrous conditions in an excess of an inert organic solvent, the mole ratio of said solvent to said chloride being within the range of from about 100 to 5,000, separating from the resultant reaction products a cyclic ketene fraction, hydrolyzing and decarboxylating the latter, and recovering a cyclic ketone.

4. The process of claim 2 further characterized in that said dehydrohalogenating step is carried out at a temperature of from about 0° C. to about 100° C.

5. The process of claim 2 further characterized in that said dehydrohalogenating step is carried out at the refluxing temperature of said solvent.

6. The process of claim 2 further characterized in that said mole ratio of said solvent to said halide is within the range of from about 200 to about 2,000.

7. The process of claim 2 further characterized in that the reaction time in said dehydrohalogenating step is within the range of from about 5 to about 75 hours.

8. The process of claim 2 further characterized in that said solvent comprises diethylether.

9. The process of claim 2 further characterized in that said amine comprises a trialkylamine.

10. The process of claim 2 further characterized in that said amine comprises triethylamine.

11. The process of claim 2 further characterized in that said halide comprises an aliphatic dicarboxylic acid halide.

12. A process for the synthesis of civetone which comprises dehydrochlorinating the chloride of 9-hexadecenedioic acid by reacting said chloride with an aliphatic tertiary amine under anhydrous conditions in an excess of an inert organic solvent, the mole ratio of said solvent to said chloride being within the range of from about 100 to about 5,000, separating a cyclic ketene intermediate, hydrolyzing and decarboxylating the latter, and recovering civetone.

13. A process for the synthesis of dl-muscone which comprises dehydrochlorinating the chloride of 3-methyl-hexadecanedioic acid by reacting said chloride with an aliphatic tertiary amine under anhydrous conditions in an excess of an inert organic solvent, the mole ratio of said solvent to said chloride being within the range of from about 100 to about 5,000, separating a cyclic ketene intermediate, hydrolyzing and decarboxylating the latter, and recovering dl-muscone.

14. A process for preparing cyclic ketones which comprises dehydrohalogenating a dicarboxylic acid halide having from 8 to 34 carbon atoms in the dicarboxylic chain by reacting said halide with an aliphatic tertiary amine under anhydrous conditions in an excess of an inert organic solvent, the mole ratio of said solvent to said halide being within the range of from about 100 to about 5,000, filtering the resultant reaction products to separate a solution of a cyclic ketene fraction in said solvent from precipitated tertiary amine hydrohalide, hydrolyzing and decarboxylating said cyclic ketene fraction, and recovering a cyclic ketone.

15. A process for preparing cyclic ketones which comprises dehydrohalogenating a dicarboxylic acid halide having from 8 to 34 carbon atoms in the dicarboxylic chain by reacting said halide with an aliphatic tertiary amine under anhydrous conditions in an excess of an inert organic solvent, the mole ratio of said solvent to said halide being within the range of from about 100 to about 5,000, separating from the resultant reaction products a cyclic ketene fraction, treating the latter with alcoholic potassium hydroxide to effect hydrolysis and decarboxylation thereof, and recovering a cyclic ketone.

16. A process for preparing cyclic ketones which comprises dehydrohalogenating a dicarboxylic acid halide having from 8 to 34 carbon atoms in the dicarboxylic chain by reacting said halide with an aliphatic tertiary amine under anhydrous conditions in an excess of an inert organic solvent, the mole ratio of said solvent to said halide being within the range of from about 100 to about 5,000, separating from the resultant reaction products a cyclic ketene fraction, treating the latter with an acidic solution of water and dioxane to effect hydrolysis and decarboxylation thereof, and recovering a cyclic ketone.

17. A process for the synthesis of large ring carbocyclic ketones which comprises reacting a dialdoketene having the formula $$O=C=CH-M-CH=C=O$$

where M is a bridging group having from 4 to 30 carbon atoms in a chain, under anhydrous conditions in the presence of an excess of an inert organic solvent to form a cyclic ketene intermediate, the mole ratio of said solvent to said dialdoketene being in excess of about 100, separating said cyclic ketene intermediate, hydrolyzing and decarboxylating the latter, and recovering a cyclic ketone.

18. A process for preparing cyclic ketones which comprises dehydrohalogenating a dicarboxylic acid halide having from 8 to 34 atoms in the dicarboxylic chain by gradually introducing said halide in small increments and under anhydrous conditions into a reaction zone containing an aliphatic tertiary amine and an excess of an inert organic solvent, the mole ratio of said solvent to said halide in said zone being within the range of from about 100 to about 5,000, separating from the resultant reaction products a cyclic ketene intermediate, subjecting the latter to hydrolysis and decarboxylation, and recovering a cyclic ketone.

19. A process for preparing cyclic ketones which comprises dehydrohalogenating a dicarboxylic acid halide having the formula $$X-CO-(CH_2)_n-CO-X$$

where X is a halogen and $n$ is an integer having a value of from 14 to 32, by reacting said halide with an aliphatic tertiary amine under anhydrous conditions in an excess of an inert organic solvent, the mole ratio of said solvent to said halide being within the range of from about 100 to about 5,000, separating from the resultant reaction products a cyclic ketene fraction, hydrolyzing and decarboxylating the latter, and recovering a cyclic ketone.

20. A process for preparing cyclic ketones which comprises dehydrohalogenating a dicarboxylic acid halide having the formula $$X-CO-(C_nH_{2n})-CO-X$$

where X is a halogen, $-(C_nH_{2n})-$ is an aliphatic branched chain group, and the dicarboxylic chain contains from 8 to 34 atoms, by reacting said halide with an aliphatic tertiary amine under anhydrous conditions in an excess of an inert organic solvent, the mole ratio of said solvent to said halide being within the range of from about 100 to about 5,000, separating from the resultant reaction products a cyclic ketene fraction, hydrolyzing and decarboxylating the latter, and recovering a cyclic ketone.

21. A process for preparing cyclic ketones which comprises dehydrohalogenating a dicarboxylic acid halide having the formula $$X-CO-(CH_2)_n-CH=CH-(CH_2)_m-CO-X$$

where X is a halogen, $n$ and $m$ are integers, and the dicarboxylic chain contains from 8 to 34 atoms, by reacting said halide with an aliphatic tertiary amine under anhydrous conditions in an excess of an inert organic solvent, the mole ratio of said solvent to said halide being within the range of from about 100 to about 5,000, separating from the resultant reaction products a cyclic ketene fraction, hydrolyzing and decarboxylating the latter, and recovering a cyclic ketone.

22. A process for the hydrolysis of dialdoketene intramolecular and inter-intramolecular condensation products which comprises subjecting a cyclic ketene intermediate resulting from the condensation of a dialdoketene having from 8 to 34 carbon atoms to the action of a hydrolyzing agent comprising an acidic solution of water and dioxane.

ALFRED T. BLOMQUIST.
RALPH DONALD SPENCER.

REFERENCES CITED

The following references are of record in the file of this patent:

UNITED STATES PATENTS

| Number | Name | Date |
|---|---|---|
| 1,873,154 | Ruzicka | Aug. 23, 1932 |
| 2,229,204 | Boese | Jan. 21, 1941 |
| 2,238,826 | Sauer | Apr. 15, 1941 |
| 2,308,184 | Lieber | Jan. 12, 1943 |
| 2,369,919 | Sauer | Feb. 20, 1945 |
| 2,383,863 | Hueter | Aug. 28, 1945 |

OTHER REFERENCES

Blomquist et al.: J. Am. Chem. Soc., vol. 70, pages 30–36 (1948).

"Beilstein's Handbuch der Organischen Chemie," vol. 7, pages 540, 544 and 545. Copyright, 1948, Berlin.